(12) United States Patent
Koutoku

(10) Patent No.: US 8,800,616 B2
(45) Date of Patent: Aug. 12, 2014

(54) PNEUMATIC TIRE WITH TREAD HAVING GROOVE AREA RATIO

(75) Inventor: Kouichi Koutoku, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 783 days.

(21) Appl. No.: 12/449,965

(22) PCT Filed: Mar. 11, 2008

(86) PCT No.: PCT/JP2008/054392
§ 371 (c)(1),
(2), (4) Date: Sep. 4, 2009

(87) PCT Pub. No.: WO2008/126568
PCT Pub. Date: Oct. 23, 2008

(65) Prior Publication Data
US 2010/0084063 A1  Apr. 8, 2010

(30) Foreign Application Priority Data
Mar. 15, 2007  (JP) ................................ 2007-067066

(51) Int. Cl.
*B60C 11/12* (2006.01)
*B60C 11/13* (2006.01)
*B60C 11/03* (2006.01)

(52) U.S. Cl.
CPC ............... *B60C 11/12* (2013.01); *B60C 11/033* (2013.04); *B60C 11/1236* (2013.04); *B60C 11/1315* (2013.04); *B60C 11/1369* (2013.04); *B60C 2011/0348* (2013.04); *B60C 2011/0397* (2013.04); *Y10S 152/03* (2013.01)

USPC ............ 152/209.16; 152/209.18; 152/209.22; 152/209.24; 152/209.27; 152/DIG. 3

(58) Field of Classification Search
CPC .. B60C 11/12; B60C 11/033; B60C 11/1236; B60C 11/1315; B60C 11/1369; B60C 2011/0348; B60C 2011/0397
USPC ............. 152/209.16, 209.18, 209.21, 209.24, 152/209.27, DIG. 3, 209.22
See application file for complete search history.

(56) References Cited

U.S. PATENT DOCUMENTS

| 3,707,177 A | | 12/1972 | Boileau | |
| 4,223,712 A | * | 9/1980 | Iwata et al. | ............... 152/209.22 |
| 4,320,790 A | * | 3/1982 | Corner et al. | ............ 152/209.27 |

(Continued)

FOREIGN PATENT DOCUMENTS

| EP | 855292 A1 * | 7/1998 |
| FR | 2878190 A1 * | 5/2006 |

(Continued)

OTHER PUBLICATIONS

Machine translation for Japan 09-011708 (no date).*

*Primary Examiner* — Steven D Maki
(74) *Attorney, Agent, or Firm* — Carrier Blackman & Associate, P.C.; Joseph P. Carrier; William D. Blackman

(57) ABSTRACT

In a pneumatic tire, a difference Gs−Ge falls in a range of Gs−Ge≥0.10, where Gs is a groove area ratio for a wear rate 0% and Ge is a groove area ratio for a wear rate 100%. Further, a groove area ratio G for a wear rate 20% falls in a range of (Gs−G)/(Gs−Ge)≥0.30, and a groove area ratio G for a wear rate 35% falls in a range of (Gs−G)/(Gs−Ge)≥0.50.

17 Claims, 8 Drawing Sheets

(56) References Cited

U.S. PATENT DOCUMENTS

| | | | |
|---|---|---|---|
| 4,515,197 A * | 5/1985 | Motomura et al. | 152/209.22 |
| 4,784,200 A * | 11/1988 | Fujiwara | 152/209.18 |
| 5,316,062 A | 5/1994 | Lurois | |
| 2002/0092591 A1* | 7/2002 | Cortes | 152/209.18 |
| 2006/0102267 A1 | 5/2006 | Takahashi et al. | |
| 2007/0125467 A1* | 6/2007 | Durand | 152/209.22 |
| 2008/0121325 A1* | 5/2008 | Durand | 152/209.18 |
| 2008/0149241 A1 | 6/2008 | Maruyama et al. | |

FOREIGN PATENT DOCUMENTS

| | | |
|---|---|---|
| JP | 6-072107 | 3/1994 |
| JP | 09-011708 A * | 1/1997 |
| JP | 11-034614 | 2/1999 |
| JP | 11-157308 | 6/1999 |
| JP | 2003-136915 | 5/2003 |
| JP | 2006-143019 | 6/2006 |
| JP | 2008-049958 | 3/2008 |
| WO | WO 2007/055065 | 5/2007 |

* cited by examiner

FIG.13

| | CONVENTIONAL EXAMPLE | INVENTION EXAMPLE 1 | INVENTION EXAMPLE 2 | INVENTION EXAMPLE 3 |
|---|---|---|---|---|
| GROOVE DEPTH RATIO h/h' | 0.75 | 0.40 | 0.40 | 0.40 |
| GROOVE WIDTH RATIO w/w' | 0.70 | 0.30 | 0.30 | 0.30 |
| CHANGE RATE IN REDUCTION OF GROOVE AREA  (Gs-G)/(Gs-Ge)  FOR 20% WEAR | 0.13 | 0.35 | 0.35 | 0.35 |
| CHANGE RATE IN REDUCTION OF GROOVE AREA  (Gs-G)/(Gs-Ge)  FOR 35% WEAR | 0.20 | 0.55 | 0.55 | 0.55 |
| WIDTHWISE GROOVE RATIO  $\frac{B}{A+B}$ | 0.50 | 0.50 | 0.40 | 0.40 |
| GROOVE AREA RATIO Gs FOR WEAR RATE 0% | 0.30 | 0.30 | 0.30 | 0.20 |
| GROOVE AREA RATIO Ge FOR WEAR RATE 100% | 0.10 | 0.10 | 0.10 | 0.07 |
| LOW ROLLING RESISTANCE | 100 | 110 | 115 | 120 |
| SNOW PERFORMANCE | 100 | 100 | 100 | 100 |
| WET PERFORMANCE | 100 | 100 | 100 | 100 |
| RESISTANCE FOR BIASED WEAR | 100 | 100 | 100 | 100 | ered thereon.
PNEUMATIC TIRE WITH TREAD HAVING GROOVE AREA RATIO

CROSS-REFERENCE TO RELATED APPLICATIONS

The present application is a U.S. National phase of, and claims priority based on PCT/JP2008/054392 filed 11 Mar. 2008, which, in turn, claims priority from Japanese patent application 2007-067066, filed 15 Mar. 2007. The entire disclosure of each of the referenced priority documents is incorporated herein by reference.

TECHNICAL FIELD

The present invention relates to a pneumatic tire. The invention particularly relates to a pneumatic tire that achieves improved tire rolling resistance, while maintaining snow braking and wet performance.

BACKGROUND ART

Pneumatic tires in recent years have widthwise grooves arranged in center and shoulder areas of a tread to ensure their braking and driving performance. Such a tread pattern is called a traction pattern. Pneumatic tires with a traction pattern have challenges to maintain snow braking and wet performance of the tire. Further, such pneumatic tires tend to have an increased tire rolling resistance due to a large number of widthwise grooves arranged thereon.

Patent Document 1 discloses a known technology of a conventional pneumatic tire that is related to the present invention. The conventional pneumatic tire has wide grooves including a pair of main grooves that are provided on its tread outer surface to be away from an equatorial plane thereof toward tread edges by a distance 0.41 times to 0.75 times as large as half of a tread width W. Further, the tread outer surface is segmented to a center area positioned in a center portion between the paired main grooves in a width direction, and shoulder areas positioned between the center portion of the paired main grooves and the both tread edges. In the conventional tire in which a negative ratio is reduced to nearly equal values for the center area and each of the shoulder areas from when the tire is new to when it gets 75% wear, a reduction rate of negative ratio at the center area from when the tire is new to when it gets 75% wear is reduced.

Patent Document 1: Japanese Patent Application Laid-open No. H11-34614

DISCLOSURE OF INVENTION

Problem to be Solved by the Invention

An object of the present invention is to provide a pneumatic tire that achieves improved tire rolling resistance, while maintaining snow braking and wet performance.

Means for Solving Problem

A pneumatic tire according to one aspect of the present invention has a tread that includes at least three circumferential main grooves extending in a tire circumferential direction, a plurality of widthwise grooves extending in a tire width direction, and a plurality of block arrays segmented by the circumferential main grooves and the widthwise grooves, and provided that a ratio of a sum A+B of a total groove area A of the circumferential main grooves and a total groove area B of the widthwise grooves on a tire-ground contact surface to a tire-ground contact area X is defined as a groove area ratio $G=(A+B)/X$, and that a wear rate of the tread is defined based on a condition where a remaining groove depth of the circumferential main grooves is 1.6 millimeters as a reference (100%), a difference Gs−Ge falls in a range of $Gs-Ge \geq 0.10$, where Gs is a groove area ratio for a wear rate 0% and Ge is a groove area ratio for a wear rate 100%, the groove area ratio G for a wear rate 20% is in a range of $(Gs-G)/(Gs-Ge) \geq 0.30$, and the groove area ratio G for a wear rate 35% is in a range of $(Gs-G)/(Gs-Ge) \geq 0.50$.

In the pneumatic tire, (1) provided that a groove area ratio for a wear rate 0% is Gs, and a groove area ratio for a wear rate 100% is Ge, a difference Gs−Ge falls in a predetermined range. Thus, the reduction in the groove area ratio G is optimized from when the tire is new to when the tire is in the last stage of wearing. This ensures the reduction range of the groove area ratio G appropriately, providing an advantage of reducing the tire rolling resistance. Further, (2) the groove area ratio G for a wear rate 20% and the groove area ratio G for a wear rate 35% fall in predetermined ranges of (Gs−G)/(Gs−Ge). Thus, the reduction in the groove area ratio G is optimized in the early stage of wearing. This ensures the stiffness of the block arrays in the early stage of wearing, providing an advantage of reducing the tire rolling resistance from the early stage of wearing.

Further, in the pneumatic tire according to another aspect of the present invention, the groove area ratio G of the tread for each wear rate is adjusted by providing a bottom-up section on bottom of the widthwise grooves.

In the pneumatic tire, when the block arrays are worn and their groove depth is reduced, the bottom-up sections of the widthwise grooves appear on the ground-engaging surface of the block arrays, so that the groove area B of the widthwise grooves is reduced. By adjusting the range for providing the bottom-up sections, the groove area B of the widthwise grooves is optimized for each wear rate. This provides an advantage of adjusting the groove area ratio G of the tread appropriately for each wear rate.

Further, in the pneumatic tire according to still another aspect of the present invention, the groove area ratio G of the tread for each wear rate is adjusted by changing a groove wall angle of the widthwise grooves along a groove depth direction.

In the pneumatic tire, when the block arrays are worn and their groove depth is reduced, the groove width of the widthwise grooves is reduced due to the change in groove wall angle $\phi$, so that the groove area B of the widthwise grooves is reduced. By adjusting the groove wall angle $\phi$, the groove area B of the widthwise grooves 3 is optimized for each wear rate. This provides an advantage that the groove area ratio G of the tread is adjusted appropriately for each wear rate.

Further, in the pneumatic tire according to still another aspect of the present invention, the widthwise grooves and the circumferential main grooves respectively have groove depths h and h' that satisfy a relation of $0.30 \leq h/h' \leq 0.70$, and the widthwise grooves and the circumferential main grooves respectively have groove widths w and w' that satisfy a relation of $0.20 \leq w/w' \leq 0.50$.

In the pneumatic tire, a ratio h/h' between the groove depth h of the widthwise grooves and the groove depth h' of the circumferential main grooves, and a ratio w/w' between the groove width w of the widthwise grooves and the groove width w' of the circumferential main grooves are optimized. Thus, the volume of the widthwise grooves is maintained appropriately. This provides an advantage of maintaining snow braking performance of the tire.

Further, in the pneumatic tire according to still another aspect of the present invention, the total groove area A of the circumferential main grooves and the total groove area B of the widthwise grooves on the tire-ground contact surface satisfy a relation of 0.25≤B/(A+B)≤0.45, for the wear rate 0%.

In the pneumatic tire, the ratio B/(A+B) between the total groove area B of the widthwise grooves and the total groove area A+B on the tire-ground contact surface is optimized. Accordingly, the block stiffness of the block arrays is optimized. This provides advantages of reducing the tire rolling resistance and improving the resistance to uneven wear of the tire.

Further, in the pneumatic tire according to still another aspect of the present invention, a plurality of closed sipes having openings toward the circumferential main grooves are arranged in the block arrays segmented by the circumferential main grooves that are on outermost portions in the tire width direction.

In the pneumatic tire, the arranged closed sipes reduce the ground contact pressure at the edges of the blocks, thus preventing uneven wear. Further, the closed sipes increase edge components of the block arrays, thus achieving improved tire traction. This provides an advantage of improving snow braking performance of the tire.

Further, in the pneumatic tire according to still another aspect of the present invention, at least one of the circumferential main grooves has a groove wall angle θ that falls in a range of θ≥8 degrees.

In the pneumatic tire, the range of the groove wall angle θ of the circumferential main grooves is optimized. This provides an advantage of reducing the tire rolling resistance.

Further, in the pneumatic tire according to still another aspect of the present invention, the groove wall angle θ of at least one of the circumferential main grooves changes along the tire circumferential direction.

In the pneumatic tire, the stiffness of the land section (the block arrays) is improved due to the change in the groove wall angle θ. This prevents the land section from bending down, providing an advantage of reducing the tire rolling resistance.

Further, in the pneumatic tire according to still another aspect of the present invention, the groove area ratio Gs for the wear rate 0% falls in a range of Gs≤0.25.

In the pneumatic tire, the groove area ratio Gs for the wear rate 0% is optimized, so that the overall stiffness of the block arrays is ensured. This prevents the distortion of the block arrays when the tire contacts the ground, providing an advantage of reducing the tire rolling resistance.

Further, in the pneumatic tire according to still another aspect of the present invention, a small groove extending in the tire circumferential direction is formed on a width-direction outside edge of the tread.

In the pneumatic tire, when the tire contacts the ground, the narrow ribs formed by the small grooves are actively worn, so that uneven wear of the shoulder ribs is prevented. This provides an advantage of improving the resistance to uneven wear of the tire.

Further, in the pneumatic tire according to still another aspect of the present invention, a small groove extending in the tire circumferential direction is formed in a buttress portion.

In the pneumatic tire, the small grooves are closed when the tire contacts the ground. This reduces the ground contact pressure in the shoulder areas (the shoulder ribs) of the tread, thus preventing the uneven wear. This provides an advantage of improving the resistance to uneven wear of the tire.

Further, in the pneumatic tire according to still another aspect of the present invention, when the tread includes a belt reinforcing layer, tread rubber having a thickness t falling in a range of 3.0 millimeters≤t≤5.5 millimeters is provided from bottom of the circumferential main groove in a center area of the tread up to the belt reinforcing layer.

In the pneumatic tire, the tread rubber of the bottom of the circumferential main grooves has an optimized thickness t. This provides an advantage of effectively reducing the tire rolling resistance.

Further, in the pneumatic tire according to still another aspect of the present invention, when heated at 100° C., tread rubber has tan δ falling in a range of 0.01≤tan δ≤0.10.

In the pneumatic tire, the tread rubber has an optimized tan δ, and therefore the hysteresis loss of the tread is reduced. This provides an advantage of effectively reducing the tire rolling resistance.

Further, the pneumatic tire according to still another aspect of the present invention is applied to a pneumatic radial tire for heavy load.

The pneumatic radial tire for heavy load tends to have an increased tire rolling resistance. Thus, it is advantageous to apply to such a pneumatic tire to achieve remarkable effects of reducing the rolling resistance.

Effect of the Invention

In a pneumatic tire according to the present invention, (1) provided that a groove area ratio for a wear rate 0% is Gs, and a groove area ratio for a wear rate 100% is Ge, a difference Gs−Ge falls in a predetermined range. Thus, the reduction in the groove area ratio G is optimized from when the tire is new to when the tire is in the last stage of wearing. This ensures the reduction range of the groove area ratio G appropriately, providing an advantage of reducing the tire rolling resistance. Further, (2) the groove area ratio G for a wear rate 20% and the groove area ratio G for a wear rate 35% fall in predetermined ranges of (Gs−G)/(Gs−Ge). Thus, the reduction in the groove area ratio G is optimized in the early stage of wearing. This ensures the stiffness of the block arrays in the early stage of wearing, providing an advantage of reducing the tire rolling resistance from the early stage of wearing.

BRIEF DESCRIPTION OF DRAWINGS

FIG. 13 is a table indicating performance test results of the pneumatic tire according to the embodiment of the present invention.

Figure 1:
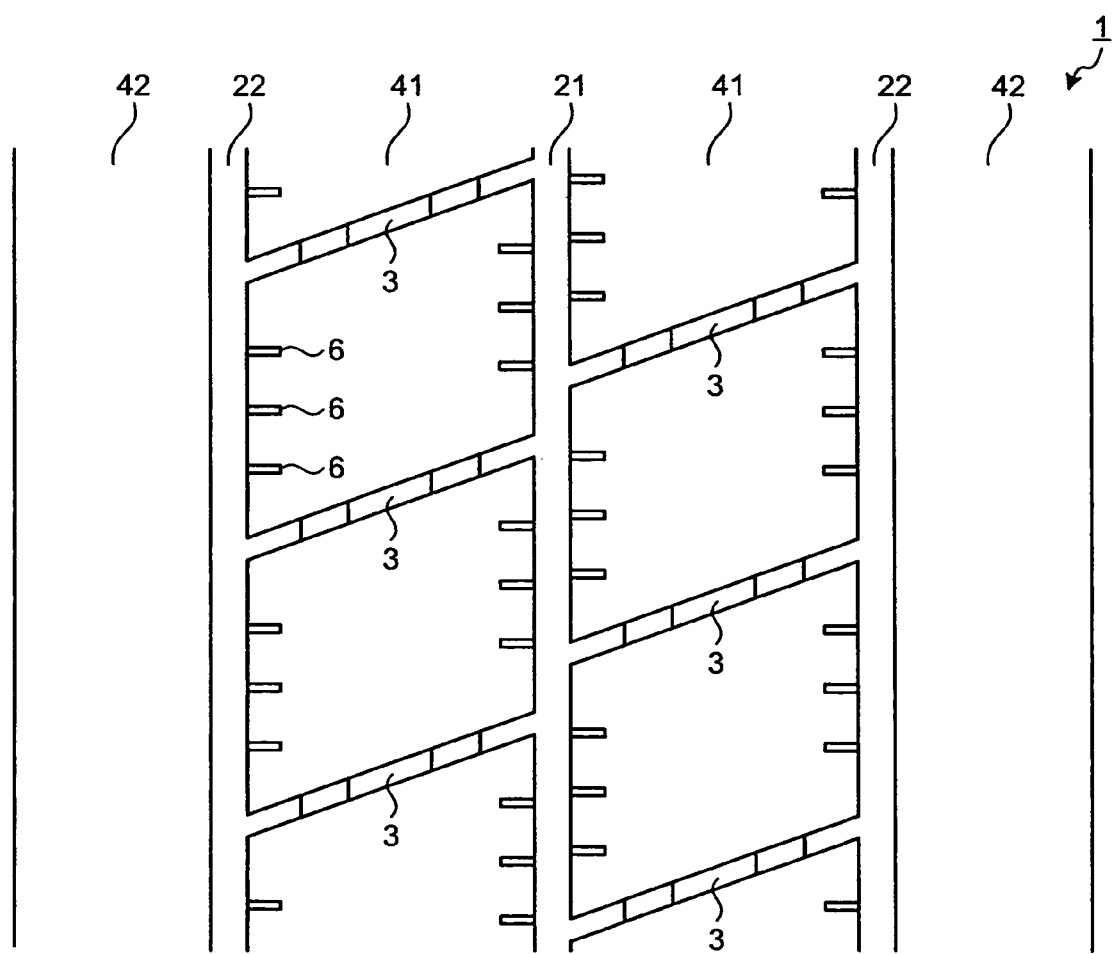
FIG. 1 is a plan view of a tread of a pneumatic tire according to an embodiment of the present invention.

EXPLANATIONS OF LETTERS OR NUMERALS 1 pneumatic tire
21, 22 circumferential main groove
3 widthwise groove
41 block array
42 shoulder rib
5 belt reinforcing layer
6 closed sipe
421 small groove
422 narrow rib
423 small groove

BEST MODE(S) FOR CARRYING OUT THE INVENTION

Exemplary embodiments of the present invention will be described in detail with reference to the accompanying drawings. The present invention is not limited by the embodiments. Constituting elements of the embodiments include elements that are convertible or feasible by a person skilled in the art, or elements being substantially the same as those elements. Further, a plurality of modifications described in this section may be combined in any way as long as being obvious to a person skilled in the art.

EMBODIMENT

Figure 2:
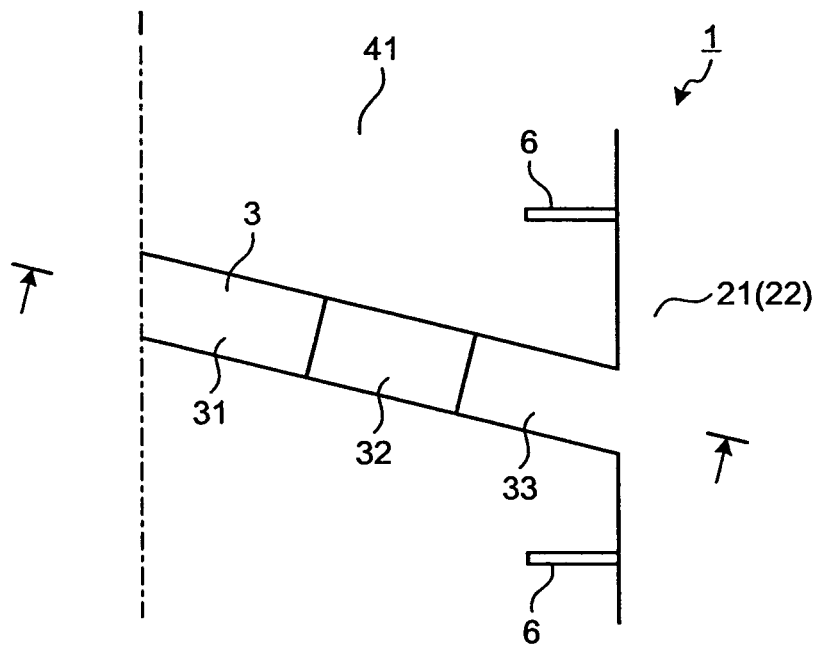
FIG. 2 is a plan view depicting a widthwise groove of the pneumatic tire shown in FIG. 1.
Figure 3:
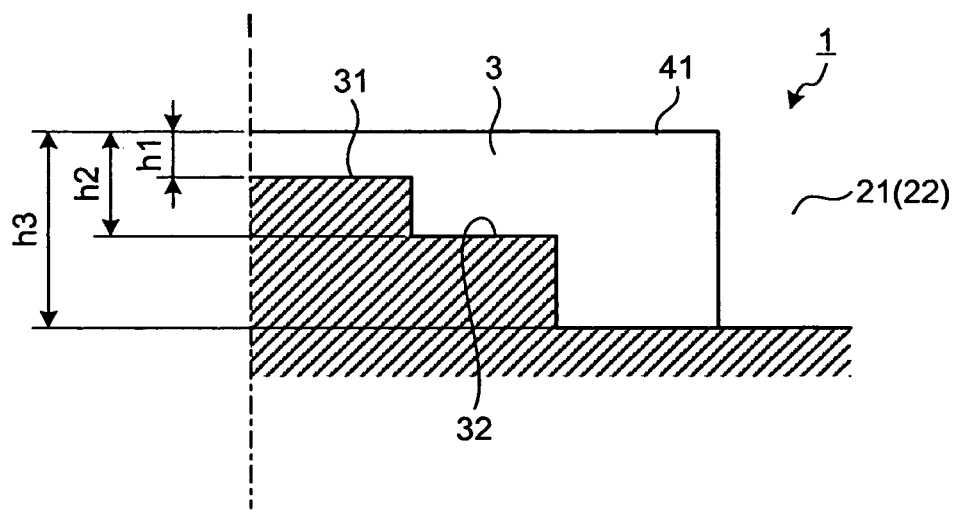
FIG. 3 is a cross sectional view depicting a widthwise groove of the pneumatic tire shown in FIG. 1.
Figure 4:
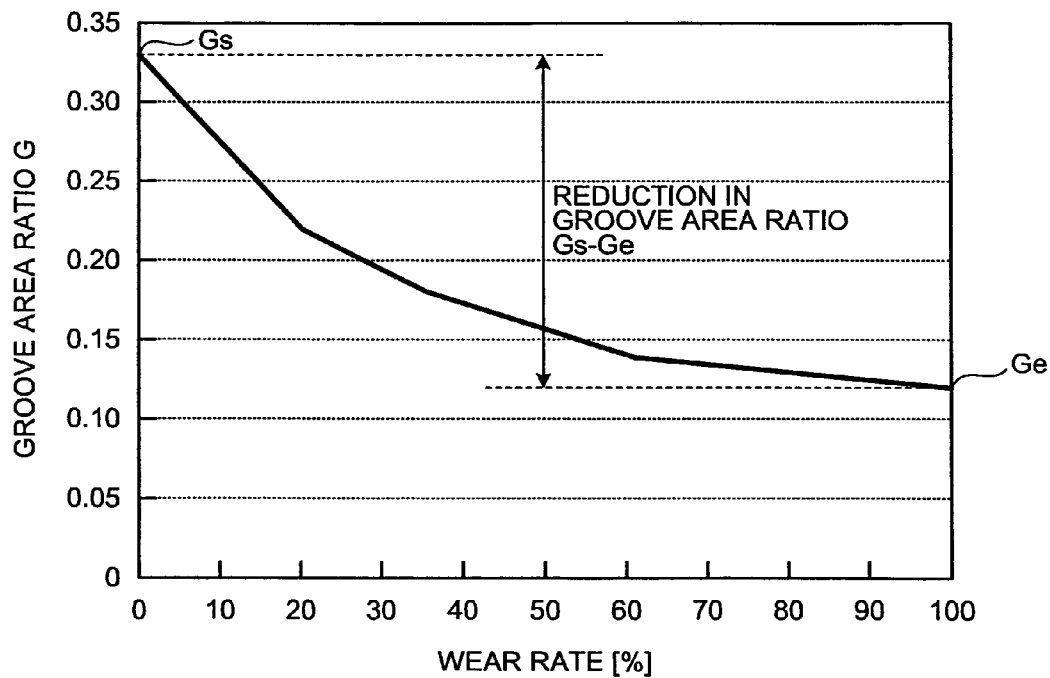
FIG. 4 is a graph for explaining performance of the pneumatic tire shown in FIG. 1.
Figure 5:
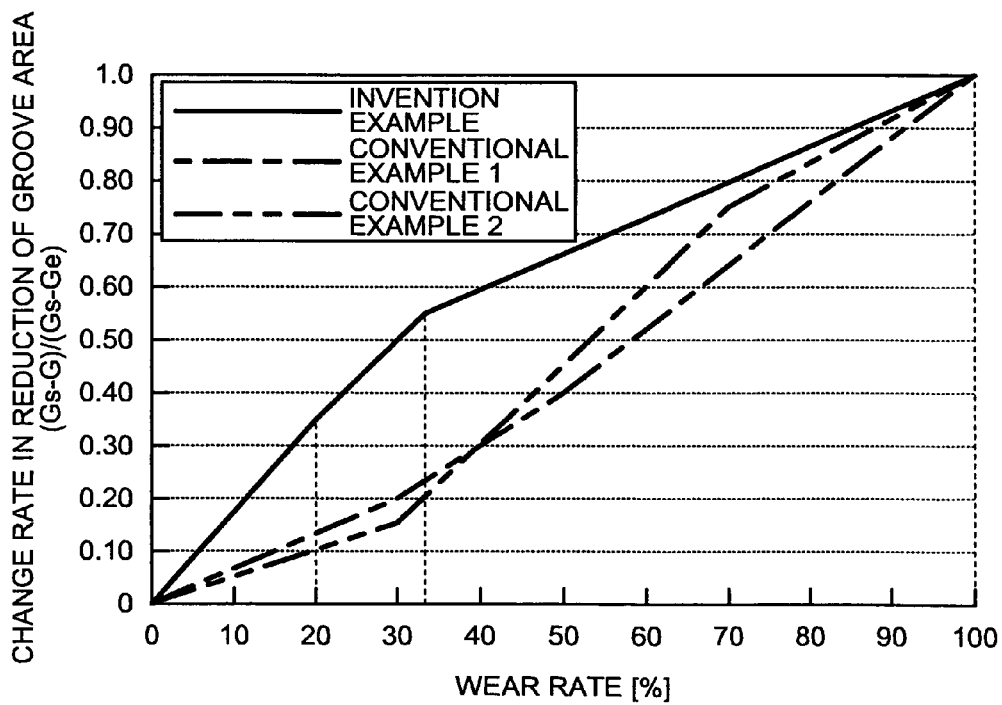
FIG. 5 is a graph for explaining performance of the pneumatic tire shown in FIG. 1.

FIG. 1 is a plan view of a tread of a pneumatic tire according to an embodiment of the present invention. FIGS. 2 and 3 are a plan view (FIG. 2) and a cross-sectional view (FIG. 3) of a widthwise groove of the pneumatic tire shown in FIG. 1. FIGS. 4 and 5 are graphs for explaining performance of the pneumatic tire shown in FIG. 1. FIGS. 6 to 12 are explanatory views of modifications of the pneumatic tire shown in FIG. 1. FIG. 13 is a table indicating performance test results of the pneumatic tire according to the embodiment of the present invention.

Pneumatic Tire

A pneumatic tire 1 has a tread that includes: at least three circumferential main grooves 21 and 22 extending in a tire circumference direction; a plurality of widthwise grooves 3 extending in a tire width direction; and a plurality of block arrays 41 segmented by the circumferential main grooves 21 and 22 and the widthwise grooves 3 (see FIG. 1). With this arrangement, a traction pattern is formed based on the block arrays.

For example, in the present embodiment, the three circumferential main grooves 21 and 22 are formed in the tread (see FIG. 1). In a center area of the tread, the widthwise grooves 3 are arranged to connect the adjoining circumferential main grooves 21 and 22. By the circumferential main grooves 21 and 22 and the widthwise grooves 3, two block arrays 41, 41 are formed in the center area of the tread. In shoulder areas of the tread are formed ribs (shoulder ribs) 42 that are segmented by the circumferential main grooves 22 positioned on outer portions in the tire width direction and by tread edges.

A ratio of a sum A+B of a total groove area A of the circumferential main grooves 21 and 22 and a total groove area B of the widthwise grooves 3 to a tire-ground contact area X on a tire-ground contact surface is referred to as a groove area ratio G=(A+B)/X. Further, a wear rate of the tread is defined based on a condition where a remaining groove depth of the circumferential main grooves 21 and 22 is 1.6 millimeters as a reference (100%).

Here, (1) a difference Gs−Ge falls in a range of Gs−Ge≥0.10, where Gs is a groove area ratio for a wear rate 0% and Ge is a groove area ratio for a wear rate 100% (see FIG. 4). Specifically, the relation Gs−Ge≥0.10 is satisfied between the groove area ratio Gs on the ground contact surface when the tire is new (the wear rate is 0%), and the groove area ratio Ge on the ground contact surface in the last stage of wearing (the wear rate is 100%). In other words, when the tread is worn, the groove area (A+B) is reduced by at least 10% or greater with respect to the tire-ground contact area X, on the tire-ground contact surface.

Further, (2) The groove area ratio G for a wear rate 20% falls in a range of (Gs−G)/(Gs−Ge)≥0.30, and the groove area ratio G for a wear rate 35% falls in a range of (Gs−G)/(Gs−Ge)≥0.50 (see FIG. 5). In other words, a relation between the wear rate of the tread and the reduction in the groove area ratio G is defined so that the groove area A+B is reduced appropriately in the early stage of wearing. Specifically, the relation between the wear rate and the reduction in the groove area ratio G is defined so that the reduction in the groove area ratio G in the early stage of wearing is larger than that of an existing conventional tire.

The tire-ground contact surface refers to a surface where the tire makes contact with a flat plate when the tire attached to an applicable rim is applied with a specified internal pressure, while being placed perpendicularly to the flat plate with no-load and static conditions. Based on the tire-ground contact surface as a reference, the total groove area A of the circumferential main grooves 21 and 22, the total groove area B of the widthwise grooves 3, and the tire-ground contact area X are specified.

The applicable rim refers to an "applicable rim" specified by the Japan Automobile Tyre Manufacturers Association, Inc. (JATMA), a "Design Rim" specified by the Tire and Rim Association, Inc. (TRA), and a "Measuring Rim" specified by the European Tyre and Rim Technical Organization (ETRTO). A normal internal pressure refers to a "maximum air pressure" specified by JATMA, a maximum value of "TIRE LOAD LIMITS AT VARIOUS COLD INFLATION PRESSURES" specified by TRA, and an "INFLATION PRESSURES" specified by ETRTO. A specified load refers to a "maximum load capacity" specified by JATMA, a maximum value of "TIRE LOAD LIMITS AT VARIOUS COLD INFLATION PRESSURES" specified by TRA, a "LOAD CAPACITY" specified by ETRTO. As for passenger tires, the specified internal pressure is an air pressure of 180 kPa, and the specified load is a maximum load capacity: 88%.

Effects

In a pneumatic tire according to the present invention, (1) provided that a groove area ratio for a wear rate 0% is Gs, and a groove area ratio for a wear rate 100% is Ge, a difference Gs−Ge falls in a predetermined range. Thus, the reduction in the groove area ratio G is optimized from when the tire is new to when the tire is in the last stage of wearing. This ensures the reduction range of the groove area ratio G appropriately, providing an advantage of reducing the tire rolling resistance. For example, when Gs−Ge<0.10, a variation in the groove area ratio G is small between the early stage and the last stage of wearing. Thus, effects of reducing the rolling resistance cannot be obtained sufficiently.

Further, (2) the groove area ratio G for a wear rate 20% and the groove area ratio G for a wear rate 35% fall in predetermined ranges of (Gs−G)/(Gs−Ge). Thus, the reduction in the groove area ratio G is optimized in the early stage of wearing. This ensures the stiffness of the block arrays 41, 41 in the early stage of wearing, providing an advantage of reducing the tire rolling resistance from the early stage of wearing. For example, when the groove area ratio G in the early stage of wearing (when the wear rate ranges from 20% to 35% falls out of the above range, the groove area ratio G is not reduced much. Thus, the tire rolling resistance is not effectively reduced.

Configuration for Specifying Groove Area Ratio G

To specify the groove area ratio G as described, the pneumatic tire 1 includes, for example, bottom-up sections 31 and 32 on the bottom of the widthwise grooves 3. With this arrangement, the groove area ratio G of the tread is adjusted for each wear rate (see FIGS. 2 and 3). Specifically, the widthwise grooves 3 include the bottom-up sections 31 and 32 on the bottom thereof, so that groove depths h1, h2, and h3 in respective portions of each widthwise groove 3 are changed by the bottom-up sections 31 and 32. By adjusting the groove depths h1, h2, and h3, the groove area ratio G of the tread is optimized for each wear rate.

With this arrangement, when the block arrays 41 are worn and their groove depth is reduced, the bottom-up sections 31 and 32 of the widthwise grooves 3 appear on the ground-engaging surface of the block arrays 41, so that the groove area B of the widthwise grooves 3 is reduced. By adjusting the range for providing the bottom-up sections 31 and 32, the groove area B of the widthwise grooves 3 is optimized for each wear rate. This provides an advantage of adjusting the groove area ratio G of the tread appropriately for each wear rate.

For example, in the present embodiment, the widthwise grooves 3 include the bottom-up sections 31 and 32 of a plurality of levels on the bottom thereof (see FIGS. 2 and 3). Due to the bottom-up sections 31 and 32, the widthwise grooves 3 have the groove depths h1, h2, and h3 that are changed in a stepwise fashion. By adjusting the groove depths h1, h2, and h3, the groove area ratio G of the tread is optimized for each wear rate. Further, the bottom-up sections 31 and 32 are provided such that the widthwise grooves 3 have a small groove depth in center portions thereof, and increased groove depths toward openings (portions closer to the circumferential main grooves 21 and 22) in a stepwise fashion. This arrangement improves drainage performance of the widthwise grooves 3.

Figure 6:
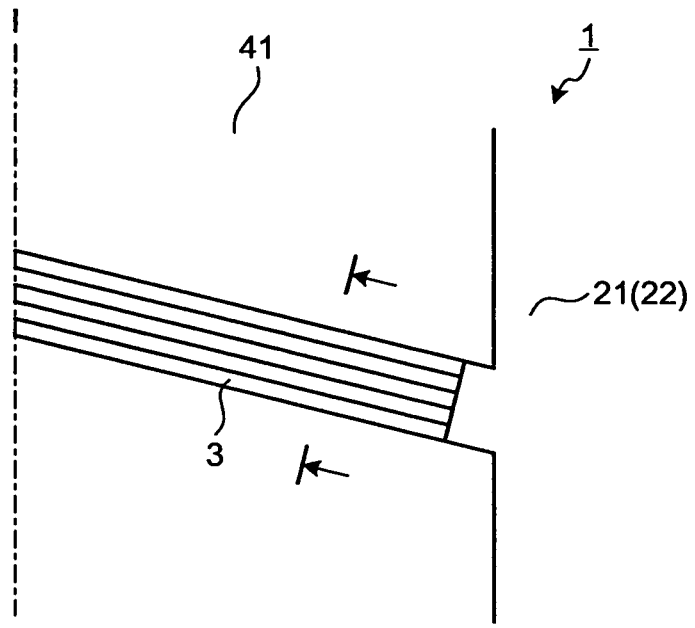
FIG. 6 is an explanatory view of a modification of the pneumatic tire shown in FIG. 1.
Figure 7:
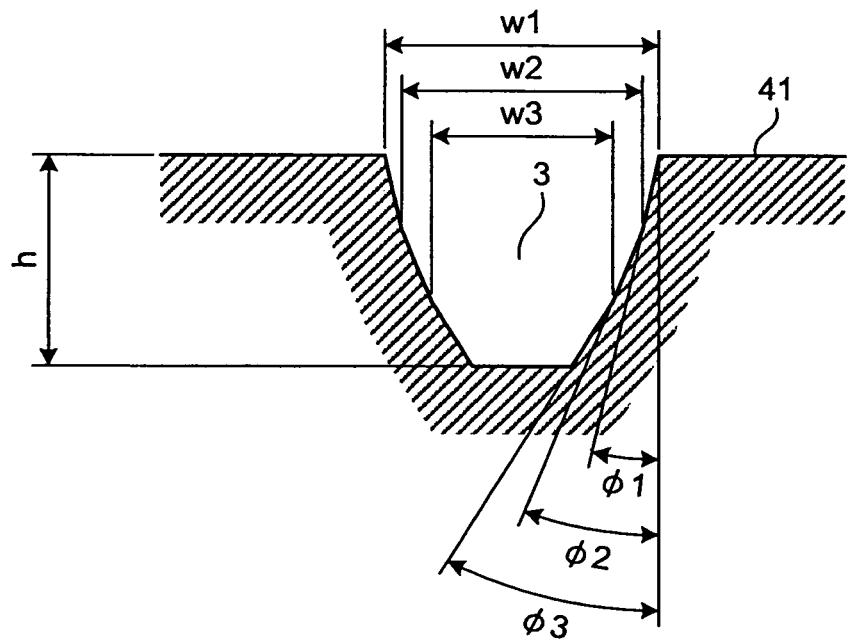
FIG. 7 is a sectional view taken along the sectional line shown in FIG. 6.

In the pneumatic tire 1, the groove area ratio G of the tread may be adjusted for each wear rate by changing the groove wall angle φ of the widthwise grooves 3 along a groove depth direction (see FIGS. 6 and 7).

With this arrangement, when the block arrays 41 (42) are worn and their groove depth is reduced, the groove width of the widthwise grooves 3 is reduced due to the change in the groove wall angle φ, so that the groove area B of the widthwise grooves 3 is reduced. By adjusting the groove wall angle φ, the groove area B of the widthwise grooves 3 is optimized for each wear rate. This provides an advantage of adjusting the groove area ratio G of the tread appropriately for each wear rate.

For example, in the present embodiment, the widthwise grooves 3 have groove wall angles φ1 to φ3 of a plurality of levels along the groove depth direction (see FIGS. 6 and 7). With the groove wall angles φ1 to φ3, groove widths w1 to w3 are set for the respective groove depths h. The groove wall angles φ1 to φ3 (the groove widths w1 to w3) are set so that the groove area ratio G of the tread falls in a desirable range for each wear rate when the block arrays 41 are worn and their groove depth h is reduced.

Additional Matter 1

Figure 8:
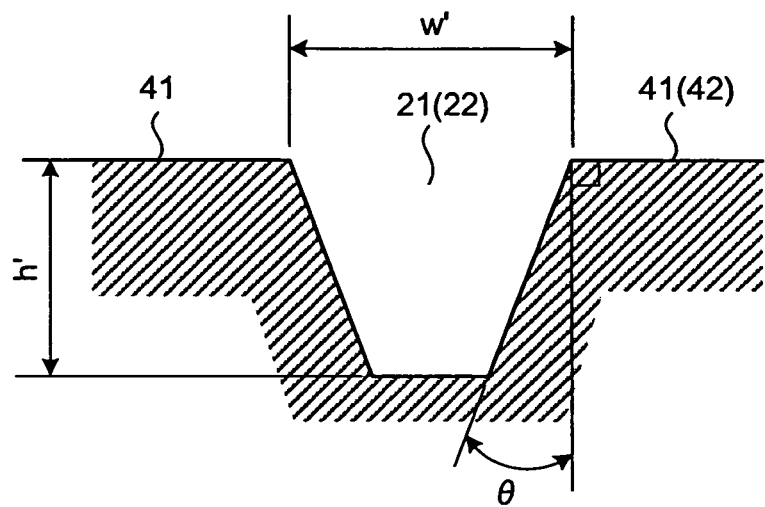
FIG. 8 is an explanatory view of a modification of the pneumatic tire shown in FIG. 1.

The pneumatic tire 1 is preferably arranged such that, when the wear rate is 0% (when the tire is new), the groove depth h of the widthwise grooves 3 and the groove depth h' of the circumferential main grooves 21 (22) satisfy a relation of 0.30≤h/h'≤0.70, and also that the groove width w (w1) of the widthwise grooves 3 and the groove width w' of the circumferential main grooves 21 (22) satisfy a relation of 0.20≤w/w'≤0.50 (see FIGS. 7 and 8).

With this arrangement, a ratio h/h' between the groove depth h of the widthwise grooves 3 and the groove depth h' of the circumferential main grooves 21 (22), and a ratio w/w' between the groove width w of the widthwise grooves 3 and the groove width w' of the circumferential main grooves 21 (22) are optimized. Thus, the volume of the widthwise grooves 3 is maintained appropriately. This provides an advantage of maintaining snow braking performance of the tire.

Additional Matter 2

The pneumatic tire 1 is preferably arranged such that, the total groove area A of the circumferential main grooves 21 and 22, and the total groove area B of the widthwise grooves 3 on the tire-ground contact surface satisfy a relation of 0.25≤B/(A+B)≤0.45 when the wear rate is 0% (when the tire is new). Specifically, a ratio S=B/X is satisfied between the total groove area B of the widthwise grooves 3 and the tire-ground contact area X, on the tire-ground contact surface. Preferably, a ratio S/Gs(=B/(A+B)) between the ratio S(=B/X) and the groove area ratio Gs(=(A+B)/X) for the wear rate 0% satisfy a relation of 0.25≤S/Gs≤0.45.

With this arrangement, the ratio B/(A+B) between the total groove area B of the widthwise grooves 3 and the total groove area A+B on the tire-ground contact surface is optimized. Accordingly, the block stiffness of the block arrays 41 is optimized. This provides advantages of reducing the tire rolling resistance and improving the resistance to uneven wear of the tire. For example, when B/(A+B)<0.25, the block stiffness is increased, causing uneven wear on the blocks more likely. When 0.45<B/(A+B), the block stiffness is reduced, degrading the tire rolling resistance.

Additional Matter 3

In the pneumatic tire 1, a plurality of closed sipes 6 having openings toward the circumferential main grooves 22 are preferably arranged in the block arrays 41 that are segmented by the outermost circumferential main grooves 22 in the tire width direction (see FIG. 1). The closed sipes 6 are arranged in, among the block arrays 41, at least the block arrays 41 that are segmented by the outermost circumferential main grooves 22 in the tire width direction.

With this arrangement, the arranged closed sipes 6 increase edge components of the block arrays 41, thus achieving improved tire traction. This provides an advantage of improving snow braking performance of the tire.

For example, in the present embodiment, the two block arrays 41, 41 are formed in the center area of the tread by the three circumferential main grooves 21 and 22 and by the widthwise grooves 3 connecting the adjoining circumferential main grooves 21 and 22 (see FIG. 1). In the block arrays 41, the closed sipes 6 having openings toward the circumferential main grooves 21 (22) are formed. The closed sipes 6 are formed on both edges of the block arrays 41, and arranged along the circumferential main grooves 21 (22). This arrangement improves the tire traction.

Additional Matter 4

In the pneumatic tire 1, the groove wall angle θ of at least one of the circumferential main grooves 21(22) is preferably in the range of θ≥8 degrees (see FIG. 8). This arrangement optimizes the range of the groove wall angle θ of the circumferential main groove(s) 21(22), providing an advantage of reducing the tire rolling resistance. For example, when θ<8 degrees, with an increased distortion of the tread rubber due to the rolling movement of the tire, the blocks bend down and the tire rolling resistance is increased. By setting θ≥8 degrees and making the blocks have trapezoid cross sections, the blocks are prevented from bending down, and the tire rolling resistance is reduced. The groove wall angle θ is defined as a tilt angle formed by a perpendicular line to the ground-engaging surface of the land section and by a groove wall surface of the circumferential main groove(s) 21(22), in a cross sectional view of the circumferential main groove(s) 21(22) taken along the groove depth direction.

Figure 9:
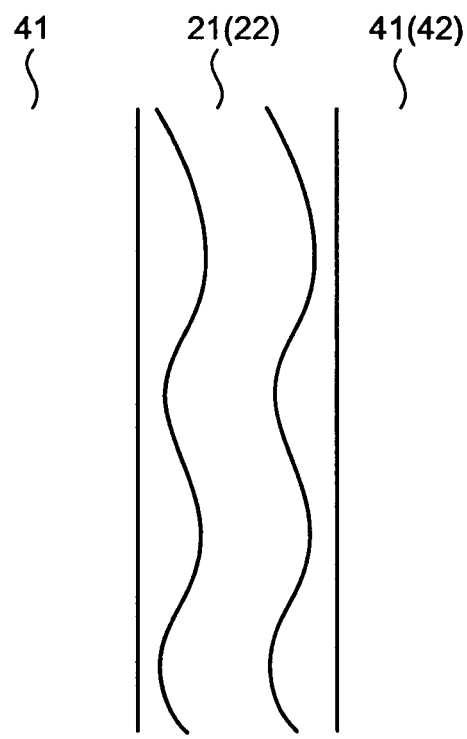
FIG. 9 is an explanatory view of a modification of the pneumatic tire shown in FIG. 1.

In the pneumatic tire 1, the groove wall angle θ of at least one of the circumferential main grooves 21(22) is preferably changed along the tire circumferential direction (see FIG. 9). For example, according to the present embodiment, in the plan view of the tread, the groove wall angle θ of the circumferential main groove(s) 21(22) is changed in a wave or zigzag manner along the tire circumferential direction. This arrangement improves the stiffness of the land section (the block arrays 41) due to the change in the groove wall angle θ. This prevents the land section from bending down, providing an advantage of reducing the tire rolling resistance.

Additional Matter 5

In the pneumatic tire 1, the groove area ratio Gs on the ground contact surface for the wear rate 0% (when the tire is new) preferably falls in a range of Gs≤0.25, and more preferably in a range of 0.20≤Gs≤0.25.

With this arrangement, the groove area ratio Gs for the wear rate 0% is optimized, so that the overall stiffness of the block arrays 41 is ensured. This prevents the distortion of the block arrays 41 when the tire contacts the ground, providing an advantage of reducing the tire rolling resistance.

Additional Matter 6

Figure 10:
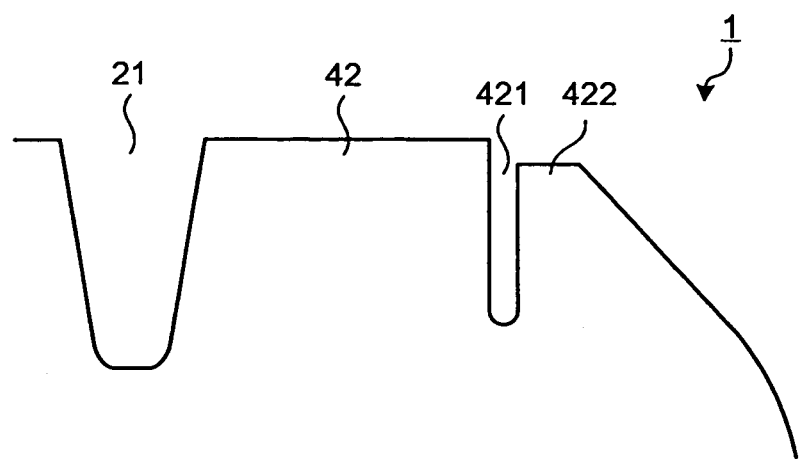
FIG. 10 is an explanatory view of a modification of the pneumatic tire shown in FIG. 1.

In the pneumatic tire 1, small grooves extending in the tire circumferential direction are preferably formed on widthdirection outside edges of the tread (see FIG. 10). For example, in the present embodiment, small grooves 421 are formed in the shoulder ribs 42. The small grooves 421 extend in the tire circumferential direction, along width-direction outside edges of the shoulder ribs 42. With the small grooves 421, narrow ribs 422 are formed on the width-direction outside edges of the shoulder ribs 42. With this arrangement, when the tire contacts the ground, the narrow ribs 422 formed by the small grooves 421 are actively worn, so that uneven wear of the shoulder ribs 42 is prevented. This provides an advantage of improving the resistance to uneven wear of the tire.

Figure 11:
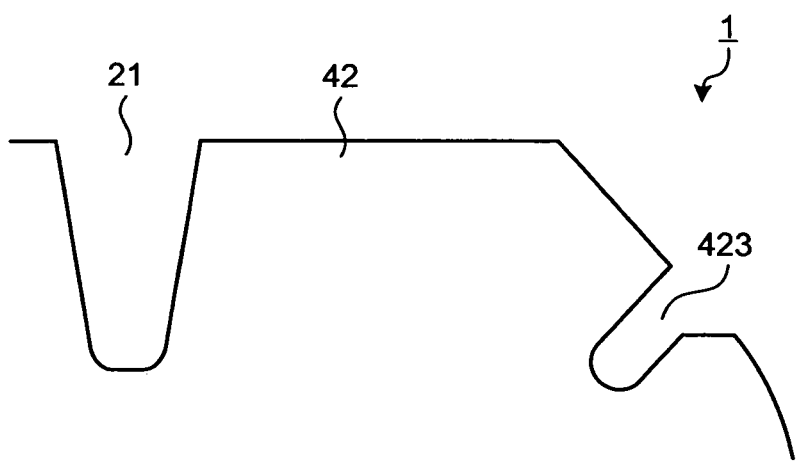
FIG. 11 is an explanatory view of a modification of the pneumatic tire shown in FIG. 1.

In the pneumatic tire 1, small grooves 423 extending in the tire circumferential direction are preferably formed in a buttress portion (see FIG. 11). With this arrangement, the small grooves 423 are closed when the tire contacts the ground. Accordingly, the ground contact pressure in the shoulder areas (the shoulder ribs 42) of the tread is reduced, and the uneven wear is prevented. This provides an advantage of improving the resistance to uneven wear of the tire.

Additional Matter 7

Figure 12:
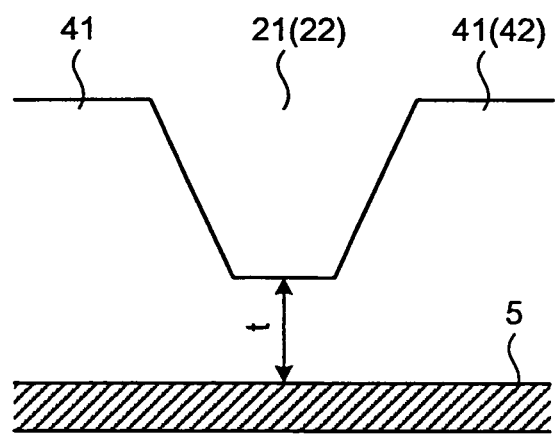
FIG. 12 is an explanatory view of a modification of the pneumatic tire shown in FIG. 1.

In the pneumatic tire 1, when the tread includes a belt reinforcing layer 5, tread rubber extending from the bottom of the circumferential main grooves 21 and 22 in the center area of the tread up to the belt reinforcing layer 5 preferably has a thickness t of 3.0 millimeters≤t≤5.5 millimeters (see FIG. 12). This arrangement optimizes the thickness t of the tread rubber of the bottom of the circumferential main grooves 21 and 22, providing an advantage of efficiently reducing the tire rolling resistance. For example, when 5.5 millimeters<t, with an increased distortion of the tread rubber due to the tire contacting the ground, the blocks bend down and the tire rolling resistance is increased. When t<3.0 millimeters, external injuries caused by stone drilling or the like easily reach the belt reinforcing layer. This may cause failure, or may easily cause cracking.

In the pneumatic tire 1, when heated at 100° C., the tread rubber preferably has tan δ falling in a range of 0.01≤tan δ≤0.10. This arrangement optimizes the tan δ of the tread rubber, reducing the hysteresis loss of the tread. This provides an advantage of effectively reducing the tire rolling resistance. For example, when 0.10<tan δ, an increased amount of heat is generated in the tread rubber during rolling movement of the tire, and the tire rolling resistance is increased. When tan δ<0.01, manufacturing performance of the tire is degraded.

Applicable Subject

The pneumatic tire 1 is preferably applicable to a pneumatic radial tire for heavy load. Such a pneumatic tire tends to have an increased tire rolling resistance. Thus, it is advantageous to apply to such a pneumatic tire to achieve remarkable effects of reducing the rolling resistance.

Performance Test

According to the present embodiment, a plurality of pneumatic tires are tested under different conditions, regarding (1) low rolling resistance, (2) snow braking performance, (3) wet performance, and (4) resistance to uneven wear (see FIG. 13). In the performance test, pneumatic tires of size 275/80R22.5 are attached to applicable rims specified by JATMA, and a specified internal pressure is applied to the pneumatic tires.

In the performance test of (1) low rolling resistance, pneumatic tires are attached to a heavy load vehicle of a total vehicle weight of 25 tons (6×2), and fuel consumed from when the tires are new (the wear rate 0%) to when they are in the last stage of wearing (when the wear rate is 100%) is measured. Based on the measurement results (averaged values of the five test vehicles), index values are evaluated. The evaluation is indicated by the index values using a conventional pneumatic tire (conventional example) as a reference (100). Larger index values indicate a tendency that rolling resistance is reduced, and are therefore preferable.

In the performance test of (2) snow braking performance, pneumatic tires are attached to a heavy load vehicle of a total vehicle weight of 25 tons (6×2), and a braking distance on a snowy surface is evaluated at a travel speed of 40 km/h or greater. The evaluation is indicated by index values using a conventional pneumatic tire (conventional example) as a reference (100). Larger index values are more preferable.

In the performance test of (3) wet performance, pneumatic tires are attached to a heavy load vehicle of a total vehicle weight of 25 tons (6×2), and a braking distance on a wet road surface is evaluated at a travel speed of 40 km/h or greater. The evaluation is indicated by index values using a conventional pneumatic tire (conventional example) as a reference (100). Larger index values are more preferable.

In the performance test of (4) resistance to uneven wear and (5) cracking resistance at groove bottom, pneumatic tires are attached to a heavy load vehicle of a total vehicle weight of 25 tons (6×2), and travels 30,000 kilometers on a public paved street. After traveling, the degree of uneven wear, and the cracking occurring on the groove bottom of the small grooves serving as the widthwise grooves are observed and index values are evaluated. The evaluation is indicated by index values using a conventional pneumatic tire (conventional example) as a reference (100). Larger index values are more preferable.

As seen from the test results, the pneumatic tires 1 of invention examples 1 to 3 achieved improved low rolling resistances of the tires, while maintaining snow and wet performance of the tires. It is also found that the resistance to uneven wear of the tires is maintained. Comparing the invention examples 1 and 2, it is found that a ratio B/(A+B) between the total groove area A+B on the tire-ground contact surface and the total groove area B of the widthwise grooves 3 is optimized, so that the tire rolling resistance is reduced. Comparing the invention examples 2 and 3, it is found that the groove area ratio Gs for the wear rate 0% is optimized, so that the tire rolling resistance is reduced.

INDUSTRIAL APPLICABILITY

As described, a pneumatic tire according to the present invention is useful for improving tire rolling resistance, while maintaining snow braking and wet performance.

The invention claimed is:

1. A pneumatic tire, having a tread that includes at least three circumferential main grooves extending in a tire circumferential direction, a plurality of widthwise grooves extending in a tire width direction, and a plurality of block arrays segmented by the circumferential main grooves and the widthwise grooves, said tread further including a pair of shoulder ribs disposed outwardly of the plurality of blocks in a widthwise direction of the tire, and which are not intersected by the widthwise grooves,
   provided that a ratio of a sum A+B of a total groove area A of the circumferential main grooves and a total groove area B of the widthwise grooves on a tire-ground contact surface to a tire-ground contact area X is defined as a groove area ratio $G=(A+B)/X$, and that a wear rate of the tread is defined based on a condition where a remaining groove depth of the circumferential main grooves is 1.6 millimeters as a reference (100%),
   a difference Gs−Ge falls in a range of Gs−Ge≥0.10, where Gs is a groove area ratio for a wear rate 0% and Ge is a groove area ratio for a wear rate 100%, the groove area ratio G for a wear rate 20% is in a range of (Gs−G)/(Gs−Ge)≥0.30, and the groove area ratio G for a wear rate 35% is in a range of (Gs−G)/(Gs−Ge)≥0.50.

2. The pneumatic tire according to claim 1, wherein the groove area ratio G of the tread for each wear rate is adjusted by changing a groove wall angle of the widthwise grooves along a groove depth direction.

3. The pneumatic tire according to claim 2, wherein
   the widthwise grooves and the circumferential main grooves respectively have groove depths h and h' that satisfy a relation of 0.30≤h/h'≤0.70, and
   the widthwise grooves and the circumferential main grooves respectively have groove widths w and w' that satisfy a relation of 0.20≤w/w'≤0.50.

4. The pneumatic tire according to claim 1, wherein the total groove area A of the circumferential main grooves and the total groove area B of the widthwise grooves on the tire-ground contact surface satisfy a relation of 0.25≤B/(A+B)≤0.45, for the wear rate 0%.

5. The pneumatic tire according to claim 1, wherein a plurality of closed sipes having openings toward the circumferential main grooves are arranged in the block arrays segmented by the circumferential main grooves that are on outermost portions in the tire width direction.

6. The pneumatic tire according to claim 1, wherein at least one of the circumferential main grooves has a groove wall angle θ that falls in a range of θ≥8 degrees.

7. The pneumatic tire according to claim 1, wherein the groove wall angle θ of at least one of the circumferential main grooves changes along the tire circumferential direction.

8. The pneumatic tire according to claim 1, wherein the groove area ratio Gs for the wear rate 0% falls in a range of Gs≤0.25.

9. The pneumatic tire according to claim 1, wherein a small groove extending in the tire circumferential direction is formed on a width-direction outside edge of the tread.

10. The pneumatic tire according to claim 1, wherein a small groove extending in the tire circumferential direction is formed in a buttress portion.

11. The pneumatic tire according to claim 1, wherein, when the tread includes a belt reinforcing layer, tread rubber having a thickness t falling in a range of 3.0 millimeters≤t≤5.5 millimeters is provided from bottom of the circumferential main groove in a center area of the tread up to the belt reinforcing layer.

12. The pneumatic tire according to claim 1, wherein when heated at 100° C., tread rubber has tan δ falling in a range of 0.01≤tan δ≤0.10.

13. The pneumatic tire according to claim 1, which is applied to a pneumatic radial tire for heavy load.

14. The pneumatic tire according to claim 1, wherein each of the widthwise grooves extends only between two of the circumferential main grooves.

15. A pneumatic tire having a tread that includes at least three circumferential main grooves extending in a tire circumferential direction, a plurality of widthwise grooves extending in a tire width direction, and a plurality of block arrays segmented by the circumferential main grooves and the widthwise grooves,
   provided that a ratio of a sum A+B of a total groove area A of the circumferential main grooves and a total groove area B of the widthwise grooves on a tire-ground contact surface to a tire-ground contact area X is defined as a groove area ratio $G=(A+B)/X$, and that a wear rate of the tread is defined based on a condition where a remaining groove depth of the circumferential main grooves is 1.6 millimeters as a reference (100%),
   a difference Gs−Ge falls in a range of Gs−Ge≥0.10, where Gs is a groove area ratio for a wear rate 0% and Ge is a groove area ratio for a wear rate 100%, the groove area ratio G for a wear rate 20% is in a range of (Gs−G)/(Gs−Ge)≥0.30, and the groove area ratio G for a wear rate 35% is in a range of (Gs−G)/(Gs−Ge)≥0.50,
   wherein the groove area ratio G of the tread for each wear rate is adjusted by providing bottom-up sections on bottoms of the widthwise grooves, the bottom-up sections provided at positions corresponding to laterally intermediate portions of individual blocks of the block arrays adjacent to the widthwise grooves.

16. The pneumatic tire according to claim 15, wherein the groove area ratio G of the tread for each wear rate is adjusted by changing a groove wall angle of the widthwise grooves along a groove depth direction.

17. The pneumatic tire according to claim 16, wherein
   the widthwise grooves and the circumferential main grooves respectively have groove depths h and h' that satisfy a relation of 0.30≤h/h'≤0.70, and
   the widthwise grooves and the circumferential main grooves respectively have groove widths w and w' that satisfy a relation of 0.20≤w/w'≤0.50.

* * * * *